Sept. 19, 1950     F. W. SCHARF     2,522,724
ELECTRIC TOASTER HEATING UNIT
Filed Jan. 3, 1947
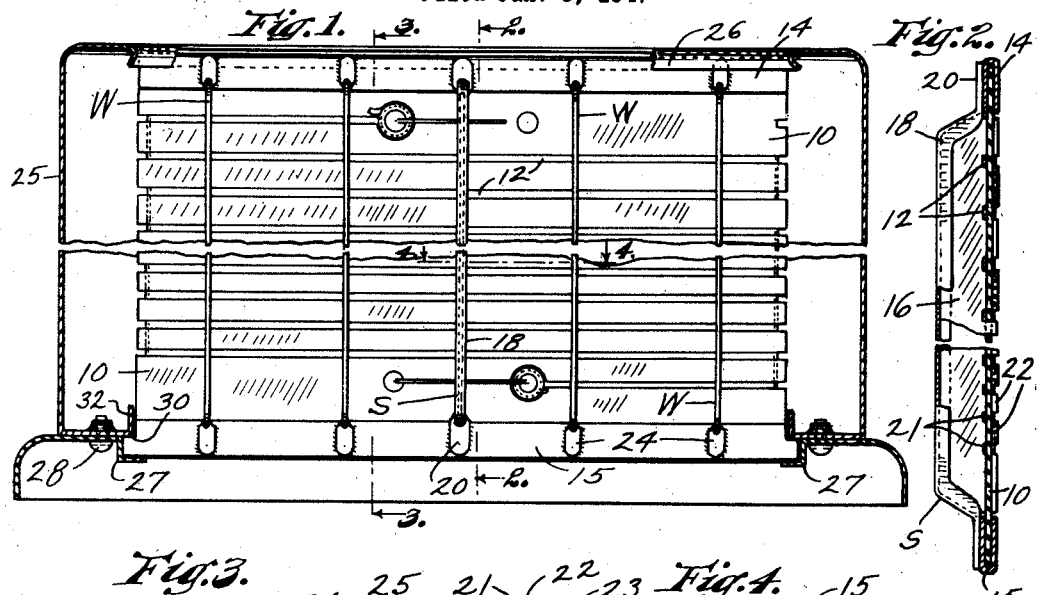
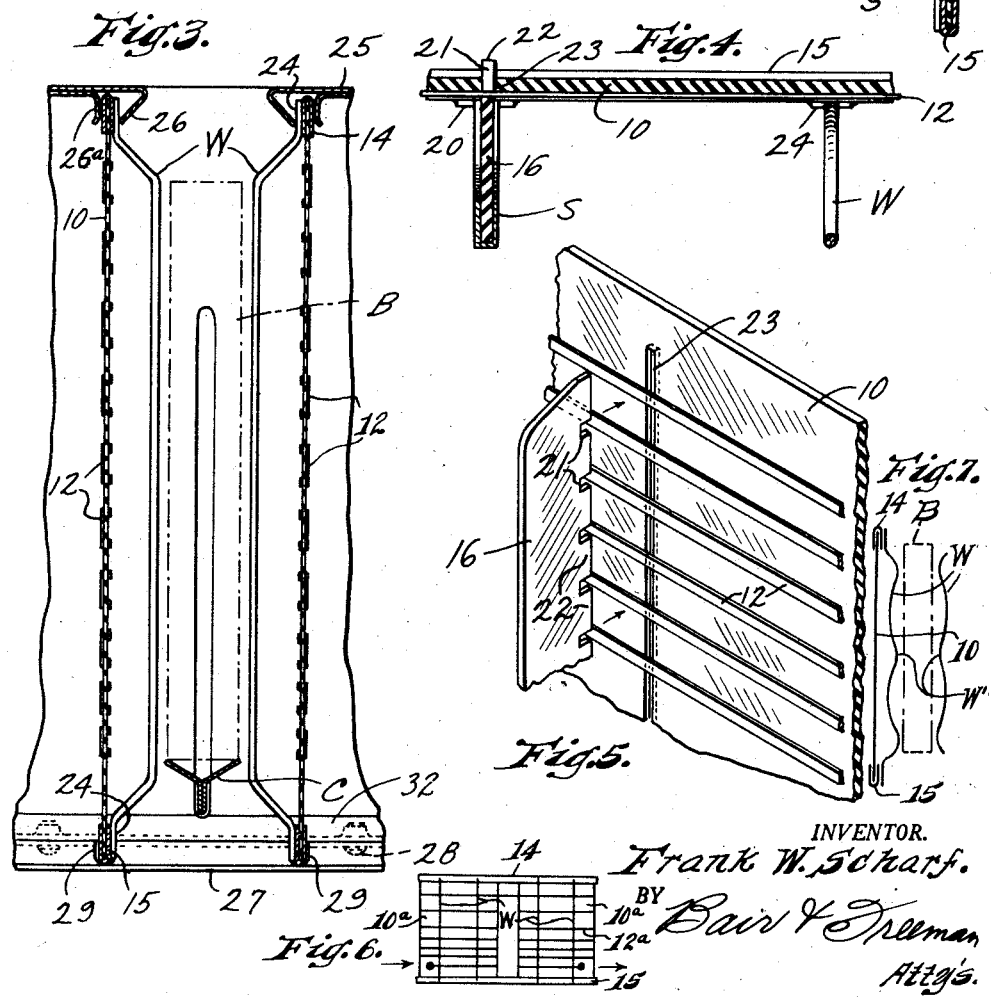
INVENTOR.
Frank W. Scharf.
BY Bair & Freeman
Attys.

Patented Sept. 19, 1950

2,522,724

UNITED STATES PATENT OFFICE 2,522,724

ELECTRIC TOASTER HEATING UNIT

Frank W. Scharf, Arcadia, Calif., assignor to Knapp-Monarch Company, St. Louis, Mo., a corporation of Missouri Application January 3, 1947, Serial No. 720,064

6 Claims. (Cl. 219—19)

My present invention relates to a heating element, and, more particularly, to one for a bread toaster or the like having guard wires and a strut attached thereto whereby the element, guard wires and strut constitute a complete unit.

One object of the invention is to provide guard wires attached to a heating element so that assembly of a toaster is simplified due to possibility of the unit being insertable and removable relative to the toaster.

Another object is to provide the unit with a strut of insulating material or the like which spans the stretches or runs of the resistance element to retain them adjacent a backing of mica or the like so that they do not bend away from the mica and thereby lessen the spacing between the heating element and a slice of bread or the like, and so that they do not sag to thereby change the spacing between adjacent stretches thus resulting in over or under heated spots on the bread being toasted.

A further object is to provide a strut for keeping the resistance element of a heating element adjacent the insulation backing of the heating element, even though the resistance element may be of considerable span, the strut being relatively thin so as not to interfere with the radiation of heat from the resistance element to the bread and thereby cause undesirable shadows on the bread.

Still a further object is to provide guard wires and a strut which may be readily attached to the usual type of heating element.

With these and other objects in view, my invention consists in the construction, arrangement and combination of the various parts of my heating element whereby the objects contemplated are attained, as hereinafter more fully set forth, pointed out in the claims and illustrated in the accompanying drawings, wherein:

Figure 1 is an elevation of a heating element embodying my invention and showing it mounted in a toaster casing;

Figure 2 is a vertical sectional view on the line 2—2 of Figure 1 showing the heating element only;

Figure 3 is a vertical sectional view on the line 3—3 of Figure 1 showing the toaster casing as well as the heating element;

Figure 4 is an enlarged horizontal sectional view on the line 4—4 of Figure 1;

Figure 5 is a perspective view of a portion of the strut and heating element to show their cooperation;

Figure 6 is a diagrammatic view of a heating element of modified construction in relation to Figure 1; and Figure 7 is a diagrammatic view of a guard wire of modified construction in relation to Figure 3.

On the accompanying drawing I have used the reference numeral 10 to indicate a sheet of mica or similar heating element backing of insulation. The backing 10 is wound with a resistance element 12 in the form of a ribbon so that it lies flat against the backing 10, and the upper and lower edges of the backing are reinforced by sheet metal channels 14 and 15. The heating element thus far described is of usual construction, except that they are ordinarily made of less width than the one shown in Figure 1 and in two or more edge to edge sections to minimize sagging and buckling of the resistance element between supported portions thereof.

I provide a means to prevent such sagging or buckling in the form of a strut S, which comprises a strip 16 of insulating material, such as mica, reinforced by a channel-shaped sheet metal element 18. The element 18, at its ends, is flattened as at 20, and the flattened ends may be secured to the reinforcing channels 14 and 15 as by spot welding, brazing or the like. The mica 16, of course, is relatively thin, and the sheet metal 18 may be also quite thin so that a strut S is provided having very little thickness to avoid casting shadows on the bread or other material being heated by the heating element, yet the edgewise presentation of the strut to the resistance element provides sufficient strength to keep the element adjacent the backing sheet 10.

The strut S is preferably notched as at 21 to provide tongues 22 to enter a slot 23 of the backing sheet 10. The notches receive the stretches of heating element as shown whereby during buckling of the heating element due to expansion when heated, the element is supported against sagging by the tongues 22. Additional struts may be provided if found desirable or necessary to serve as an effective means to prevent the usual buckling of resistance elements, which results in their closer proximity to the bread, causing burnt spots thereon.

The strut S serves as a guard element for preventing the bread B on a carrier C in the toaster from contacting the heating element 12. Additional guard elements are provided in the form of guard wires W which are of substantially the same shape as the channel 18 as shown in Figure 3, having flattened ends 24 which are spot-welded or otherwise suitably secured to the channels 14 and 15. The heating element 10—12, the strut S and the guard wires W thereby form a unitary structure which may be inserted and removed relative to a toaster casing and thus the assembly of the toaster is considerably simplified as compared with the type wherein the guard wires are individually inserted in openings or slots, and wherein, when a heating element is removed, all of the guard wires are loosened and considerably lengthen the time required for reinsertion after removal of the heating element.

On the other hand, in my arrangement, I provide for the heating element unit including the guard wires to be inserted preferably from the bottom into the toaster casing, the casing being shown in general at 25. The upper part of the casing has flanges 26 and 26a to receive the channel 14, and the channel 15 is held in position by flanges 27. These may be secured to the casing 25 as by screws 28. The flanges 27 are notched as at 29 to receive the channel 15 and position it. The ends of the channel 15 are rabbeted as at 30 to seat against flanges 32 of the casing 25 for further positioning of the heating element.

With such an arrangement as just described, it is an easy matter to change the heating element by removing the screws 28 and the flanges 27, and pulling the element out from the bottom of the casing. The guard wires being secured to the heating element do not drop out of place and a new heating element can be readily inserted and secured in position in a minimum of time.

In Figure 6, I show a modified construction wherein two separate backing sheets 10a (each about half the width of the sheet 10 in Figure 1) are wound individually with the resistance ribbon 12a so that the sag prevention strut 16 need not be provided. The backing sheets 10a are retained in assembled relation to each other by the upper and lower members 14 and 15 as in Figure 1 and the guard wires W are secured thereto as in Figures 1 and 3. Thus my particular guard wire and heating element unit is adaptable for split elements as well as those that are not split as in Figure 1 and in either case the disadvantage of loose guard wires is had.

In Figure 7, I show a modified construction wherein the wires W instead of contacting throughout the height of the bread slice B are arranged to provide contact only adjacent the upper, central and lower portions of the slice, thus minimizing the possibility of burn marks of the wires on the finished toast. By having the wires contacting at the center as indicated at W' bowing of the bread is prevented.

Some changes may be made in the construction and arrangement of the parts of my heating element unit without departing from the real spirit and purpose of my invention, and it is my intention to cover by my claims any modified forms of structure or use of mechanical equivalents which may be reasonably included within their scope.

I claim as my invention:

1. In a heating element structure, a unitary device including a backing sheet, a resistance element wound thereon with its stretches spanning said sheet, reinforcing channels along opposite edges of said backing sheet, guard elements secured to said reinforcing channels, and a strut engaging said stretches and retaining them against the surface of said backing sheet, said strut having projections through said backing sheet to retain said stretches against sagging.

2. In a heating element structure, a unitary device including a backing sheet, a resistance element wound thereon with its stretches spanning said sheet, reinforcing elements along opposite edges of said backing sheet, guard elements permanently secured to said reinforcing elements, and a strut engaging edgewise against said stretches and retaining them against the surface of said backing sheet, said strut having notches receiving said stretches to retain them against sagging.

3. In a combined heating element and guard wire unit, a backing sheet, a resistance element having stretches spanning said sheet, guard wires secured to said sheet and spaced from said heating element, and a strut having a notched edge, said backing sheet having a slot through which said notched edge projects and the notches of said strut receiving said stretches of resistance element.

4. A heating element of the character disclosed comprising a backing sheet, a resistance element having stretches spanning said sheet, reinforcing channels along opposite edges of said sheet, a strut crossing said stretches of resistance element and having its ends attached to said reinforcing channels and its edge provided with notches receiving said stretches of resistance element to prevent them from sagging, the notched edge of said strut holding said stretches in contact with said backing sheet.

5. A heating element of the character disclosed comprising a backing sheet, a resistance element having stretches spanning said sheet, a strut crossing said stretches of resistance element and having its ends attached to said backing sheet and its edge provided with notches receiving said stretches of resistance element to prevent them from sagging, the notched edge of said strut holding said stretches in contact with said backing sheet.

6. A heating element structure comprising a unitary device including a backing sheet, a resistance element wound thereon with its stretches spanning said sheet, bread guard elements secured to and carried by said heating element structure, and a strut engaging said stretches against the surface of said backing sheet to retain them against buckling away therefrom, said strut having a notch for each stretch of resistance element to prevent sagging thereof.

FRANK W. SCHARF.

REFERENCES CITED

The following references are of record in the file of this patent:

UNITED STATES PATENTS

| Number | Name | Date |
|---|---|---|
| 1,143,578 | Denhard | June 15, 1915 |
| 1,597,304 | Warner et al. | Aug. 24, 1926 |
| 1,753,601 | Eaton | Apr. 8, 1930 |
| 2,012,788 | Ireland | Aug. 27, 1935 |
| 2,061,433 | Murasco | Nov. 17, 1936 |
| 2,197,221 | Koci | Apr. 16, 1940 |
| 2,383,673 | Olving | Aug. 28, 1945 |

FOREIGN PATENTS

| Number | Country | Date |
|---|---|---|
| 333,652 | Great Britain | Aug. 21, 1930 |